US010664467B2

(12) United States Patent
Eker et al.

(10) Patent No.: US 10,664,467 B2
(45) Date of Patent: *May 26, 2020

(54) MANAGING TEST DATA IN LARGE SCALE PERFORMANCE ENVIRONMENT

(71) Applicant: International Business Machines Corporation, Armonk, NY (US)

(72) Inventors: Margaret A. Eker, Austin, TX (US); Nnaemeka I. Emejulu, Austin, TX (US); Karthikeyan Ramamoorthy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 15/707,519

(22) Filed: Sep. 18, 2017

(65) Prior Publication Data

US 2018/0004799 A1  Jan. 4, 2018

Related U.S. Application Data

(63) Continuation of application No. 14/926,751, filed on Oct. 29, 2015, now Pat. No. 9,767,141, which is a (Continued)

(51) Int. Cl.
*G06F 16/00* (2019.01)
*G06F 16/23* (2019.01)
*G06F 16/21* (2019.01)

(52) U.S. Cl.
CPC ........ *G06F 16/2365* (2019.01); *G06F 16/213* (2019.01)

(58) Field of Classification Search
CPC ...... G06F 16/236; G06F 16/213; G06F 16/84; G06F 16/9027; G06F 16/00; G06F 16/2255; G06F 16/9535; G06F 16/955; G06F 16/951; G06F 16/532; G06F 16/353; G06F 17/30371; G06F 17/2725; G06F 17/30; G06F 16/13; G06F 16/174; G06F 16/137;
(Continued)

(56) References Cited

U.S. PATENT DOCUMENTS 5,504,593 A   4/1996  Hotta et al.
5,974,418 A  10/1999  Blinn et al.
(Continued)

OTHER PUBLICATIONS

Batini, C. et al., "A comparative anysis of methodologies for database schema integration" In Journ ACM Computing Surveys (CSUR) Surveys Homepage archive—vol. 18 Issue 4, Dec. 1986—pp. 323-364—ACM.
(Continued)

*Primary Examiner* — Anh Ly
(74) *Attorney, Agent, or Firm* — Cuenot, Forsythe & Kim, LLC

(57) ABSTRACT

A method of processing a database can include comparing, using a processor, a delta file with a risk assessment criterion, wherein the delta file is generated from a first schema and a second and different schema, assigning a risk level to a change specified within the delta file according to the comparing, and applying the change of the delta file to a test database conforming to the first schema according to the assigned risk level.

18 Claims, 4 Drawing Sheets

Related U.S. Application Data continuation of application No. 13/553,333, filed on Jul. 19, 2012, now Pat. No. 9,195,691, which is a continuation of application No. 13/434,106, filed on Mar. 29, 2012, now Pat. No. 9,201,911.

(58) Field of Classification Search
CPC . G06F 3/06; G06F 11/14; G06F 16/31; G06F 16/248; G06F 16/252; G06F 16/316; G06F 16/2228; G06F 16/2477; G06F 16/24564; G06F 16/2365; G06G 17/30297; H04L 67/02
See application file for complete search history.

(56) References Cited

U.S. PATENT DOCUMENTS

| | | |
|---|---|---|
| 6,397,125 B1 | 5/2002 | Goldring et al. |
| 6,397,202 B1 | 5/2002 | Higgins et al. |
| 6,915,287 B1 | 7/2005 | Felsted et al. |
| 7,246,116 B2 | 7/2007 | Barsness et al. |
| 7,291,018 B2 | 11/2007 | Nishizawa et al. |
| 7,401,321 B2 | 7/2008 | Sit et al. |
| 7,418,461 B2 | 8/2008 | Tamma et al. |
| 7,512,840 B2 | 3/2009 | Martin et al. |
| 7,757,125 B2 | 7/2010 | Bassin et al. |
| 7,788,282 B2 | 8/2010 | Shekar |
| 7,809,763 B2 | 11/2010 | Nori et al. |
| 7,890,659 B2 | 2/2011 | Pasha et al. |
| 7,953,744 B2 | 5/2011 | Gharat et al. |
| 7,979,404 B2 | 7/2011 | Sim-Tang |
| 8,042,097 B2 | 10/2011 | Aridor et al. |
| 8,297,501 B1 | 10/2012 | Kowalchyk et al. |
| 8,504,593 B2 | 8/2013 | Gavrilov et al. |
| 8,683,323 B2 | 3/2014 | Gurfinkel et al. |
| 8,706,701 B1 | 4/2014 | Stefanov et al. |
| 8,706,761 B1 | 4/2014 | Jung et al. |
| 9,166,966 B2 | 10/2015 | Radhakrishnan |
| 9,195,691 B2 | 11/2015 | Eker et al. |
| 9,201,911 B2 | 12/2015 | Eker et al. |
| 9,767,141 B2 | 9/2017 | Eker et al. |
| 2001/0037228 A1 | 11/2001 | Ito et al. |
| 2002/0143817 A1 | 10/2002 | Dutta et al. |
| 2003/0167446 A1 | 9/2003 | Thomas |
| 2004/0098300 A1 | 5/2004 | Karwatowski et al. |
| 2004/0194016 A1 | 9/2004 | Liggitt |
| 2005/0060313 A1 | 3/2005 | Naimat et al. |
| 2005/0060645 A1* | 3/2005 | Raghavachari ...... G06F 17/2247 715/237 |
| 2005/0065977 A1 | 3/2005 | Benson et al. |
| 2005/0071359 A1* | 3/2005 | Elandassery .......... G06F 16/213 707/E17.005 |
| 2005/0149543 A1 | 7/2005 | Cohen et al. |
| 2006/0004857 A1 | 1/2006 | Daniel et al. |
| 2006/0005055 A1 | 1/2006 | Potega |
| 2006/0048137 A1 | 3/2006 | Nosseir et al. |
| 2006/0069688 A1 | 3/2006 | Shekar |
| 2006/0074793 A1 | 4/2006 | Hibbert et al. |
| 2006/0075387 A1 | 4/2006 | Martin et al. |
| 2006/0085465 A1 | 4/2006 | Nori et al. |
| 2006/0136471 A1 | 6/2006 | Ge et al. |
| 2006/0161558 A1* | 7/2006 | Tamura ............... G06F 11/0709 707/E17.005 |
| 2006/0172724 A1 | 8/2006 | Linkert et al. |
| 2006/0218160 A1* | 9/2006 | Bhatia .................. G06F 17/2211 707/E17.122 |
| 2006/0277224 A1 | 12/2006 | Aftab et al. |
| 2006/0294120 A1* | 12/2006 | Li ........................ G06F 16/213 |
| 2007/0061625 A1 | 3/2007 | Acosta et al. |
| 2007/0106599 A1 | 5/2007 | Hochberg et al. |
| 2007/0112886 A1 | 5/2007 | Huang et al. |
| 2007/0157195 A1 | 7/2007 | Gaa-Frost et al. |
| 2007/0162308 A1 | 7/2007 | Peters |
| 2007/0162316 A1 | 7/2007 | Kratschmer et al. |
| 2007/0174023 A1 | 7/2007 | Bassin et al. |
| 2007/0179983 A1 | 8/2007 | Putman |
| 2007/0203719 A1 | 8/2007 | Kenagy et al. |
| 2008/0034363 A1 | 2/2008 | Jones |
| 2008/0071806 A1 | 3/2008 | Gaurav et al. |
| 2008/0077632 A1 | 3/2008 | Tysowski et al. |
| 2008/0082560 A1 | 4/2008 | Agrawal et al. |
| 2008/0082584 A1 | 4/2008 | Jung et al. |
| 2008/0114802 A1 | 5/2008 | Gheorghloiu et al. |
| 2008/0120351 A1 | 5/2008 | Knaladkar et al. |
| 2008/0182560 A1 | 7/2008 | Beije |
| 2008/0189758 A1 | 8/2008 | Akeel et al. |
| 2008/0201359 A1 | 8/2008 | Warshavsky et al. |
| 2008/0294459 A1 | 11/2008 | Angell et al. |
| 2008/0312979 A1 | 12/2008 | Lee et al. |
| 2009/0006933 A1 | 1/2009 | Gavrilov et al. |
| 2009/0037769 A1 | 2/2009 | Babkin et al. |
| 2009/0112916 A1 | 4/2009 | Stuhec |
| 2009/0119319 A1 | 5/2009 | Li et al. |
| 2009/0150367 A1 | 6/2009 | Melnik et al. |
| 2009/0228527 A1 | 9/2009 | Wang |
| 2009/0254572 A1 | 10/2009 | Redlich et al. |
| 2009/0265100 A1 | 10/2009 | Murakami |
| 2009/0307277 A1 | 12/2009 | Grubov et al. |
| 2009/0313608 A1* | 12/2009 | Sharma ..................... G06F 8/38 707/E17.005 |
| 2009/0319980 A1 | 12/2009 | Wilson et al. |
| 2010/0011365 A1 | 1/2010 | Gerovac et al. |
| 2010/0049728 A1 | 2/2010 | Chiticariu et al. |
| 2010/0057745 A1 | 3/2010 | Li et al. |
| 2010/0131526 A1 | 5/2010 | Sun et al. |
| 2010/0138354 A1* | 6/2010 | Lawrence ............ G06Q 30/018 705/317 |
| 2010/0250497 A1 | 9/2010 | Redlich et al. |
| 2011/0004867 A1 | 1/2011 | Holden et al. |
| 2011/0047056 A1 | 2/2011 | Overman et al. |
| 2011/0055147 A1 | 3/2011 | Joerg et al. |
| 2011/0066486 A1 | 3/2011 | Bassin et al. |
| 2011/0066589 A1 | 3/2011 | Chang et al. |
| 2011/0066590 A1 | 3/2011 | Chang et al. |
| 2011/0066890 A1 | 3/2011 | Bassin et al. |
| 2011/0067005 A1 | 3/2011 | Bassin et al. |
| 2011/0078113 A1 | 3/2011 | Franz |
| 2011/0099188 A1* | 4/2011 | Ahmed ............ G06F 16/24547 707/769 |
| 2011/0099377 A1 | 4/2011 | Hoornaert |
| 2011/0126168 A1 | 5/2011 | Ilyayev |
| 2011/0145210 A1 | 6/2011 | Rathinam et al. |
| 2011/0167418 A1 | 7/2011 | Gopal et al. |
| 2011/0231454 A1* | 9/2011 | Mack .................. G06F 16/2228 707/803 |
| 2011/0238566 A1 | 9/2011 | Santos |
| 2011/0246869 A1 | 10/2011 | Vion-Dury |
| 2011/0258088 A1 | 10/2011 | Padala et al. |
| 2011/0258478 A1 | 10/2011 | Anand et al. |
| 2011/0295643 A1 | 12/2011 | Miller et al. |
| 2011/0307758 A1* | 12/2011 | Fillingim ............ G06F 11/1048 714/758 |
| 2012/0124666 A1 | 5/2012 | Kim et al. |
| 2012/0158701 A1* | 6/2012 | Otsuka ................. G06F 16/213 707/722 |
| 2013/0077532 A1 | 3/2013 | Ge et al. |
| 2013/0110879 A1 | 5/2013 | Winternitz et al. |
| 2013/0166568 A1* | 6/2013 | Binkert .................. G06F 16/86 707/741 |
| 2013/0179769 A1 | 7/2013 | Gurfinkel et al. |
| 2013/0212655 A1 | 8/2013 | Hoyos et al. |
| 2013/0262399 A1 | 10/2013 | Eker et al. |
| 2013/0262523 A1 | 10/2013 | Eker et al. |
| 2014/0257862 A1 | 9/2014 | Billman et al. |
| 2015/0026117 A1 | 1/2015 | Wang |
| 2016/0019668 A1* | 1/2016 | Kilinski ............... G06Q 50/265 705/325 |

OTHER PUBLICATIONS

Imieliriski, T. et al., "A Technique for Translating States Between Database Schemata"—In Proc. of 1982 ACM SIGMOD Int'l. Conf. on Management of Data, SIGMOD '82—pp. 61-68.

(56) References Cited

OTHER PUBLICATIONS

U.S. Appl. No. 14/926,751, Non-Final Office Action, dated Apr. 14, 2016, 17 pg.
U.S. Appl. No. 14/926,751, Non-Final Office Action, dated Aug. 31, 2016, 17 pg.
U.S. Appl. No. 14/926,751, Final Office Action, dated Feb. 6, 2017, 18 pg.
U.S. Appl. No. 14/926,751, Notice of Allowance, dated May 15, 2017, 8 pg.
"On Synchronizing with Web Service Evolution," In IEEE Int'l Conf. on Web Services, ICWS '08, Sep. 23-26, 2008, pp. 329-336.
Eaddy, M. et al.,"Whitepaper: The Value of Improving the Separation of Concerns", Columbia Univ. Computer Science Technical Reports, Part No. CUCS-001-07, 2007, <http://hdl.handle.net/10022/AC:P:29489>, 19 pg.
"Schema Comparison Tool," [online] DB Solo,LLC [retrieved Feb. 23, 2012] retrieved from the Internet: <http://www.dbsolo.com/schema_comparison.html>, 4 pgs.
Sanders, R.E., "Database cloning," DB2 Magazine, 4th Quarter, 2006, pp. 50-52, Pub. Nov. 14, 2006.
IBM, "Method and system for fix pack installation," IP.com Prior Art Database Disclosure, Disclosure No. IPCOM000180589D, dated Mar. 12, 2009, 3 pgs.
U.S. Appl. No. 13/434,106, Non-Final Office Action, dated Mar. 26, 2013, 22 pg.
U.S. Appl. No. 13/434,106, Final Office Action, dated Aug. 30, 2013, 23 pg.
U.S. Appl. No. 13/434,106, Advisory Action, dated Dec. 5, 2013, 2 pg.
U.S. Appl. No. 13/434,106, Non-Final Office Action, dated Dec. 18, 2013, 17 pg.
U.S. Appl. No. 13/434,106, Non-Final Office Action, dated Jun. 11, 2013, 18 pg.
U.S. Appl. No. 13/434,106, Non-Final Office Action, dated Oct. 16, 2014, 19 pg.
U.S. Appl. No. 13/434,106, Final Office Action, dated Feb. 23, 2015, 24 pg.
U.S. Appl. No. 13/434,106, Advisory Action, dated May 26, 2015, 2 pg.
U.S. Appl. No. 13/434,106, Ex Parte Quayle Office Action, dated May 28, 2015, 12 pg.
U.S. Appl. No. 13/434,106, Ex Parte Quayle Office Action, dated Jun. 11, 2015, 11 pg.
U.S. Appl. No. 13/434,106,Notice of Allowance, dated Jul. 27, 2015, 8 pg.
U.S. Appl. No. 13/553,333, Non-Final Office Action, dated Mar. 6, 2013, 24 pg.
U.S. Appl. No. 13/553,333, Final Office Action, dated Aug. 30, 2013, 24 pg.
U.S. Appl. No. 13/553,333, Advisory Action, dated Dec. 5, 2013, 2 pg.
U.S. Appl. No. 13/553,333, Non-Final Office Action, dated Dec. 27, 2013, 19 pg.
U.S. Appl. No. 13/553,333, Non-Final Office Action, dated Jun. 12, 2014, 19 pg.
U.S. Appl. No. 13/553,333, Non-Final Office Action, dated Oct. 24, 2014, 22 pg.
U.S. Appl. No. 13/553,333, Final Office Action, dated Mar. 12, 2015, 23 pg.
U.S. Appl. No. 13/553,333, Advisory Action, dated May 26, 2015, 2 pg.
U.S. Appl. No. 13/553,333, Ex Parte Quayle Action, dated May 28, 2015, 7 pg.
U.S. Appl. No. 13/553,333, Notice of Allowance, dated Jul. 10, 2015, 8 pg.

* cited by examiner

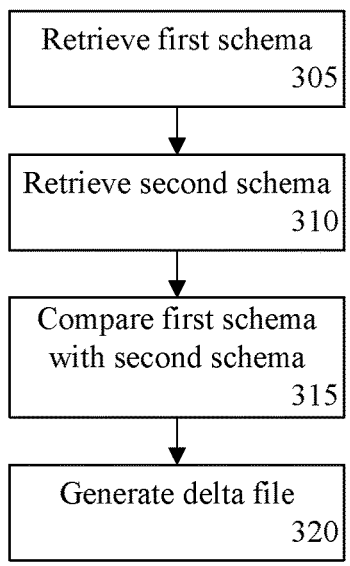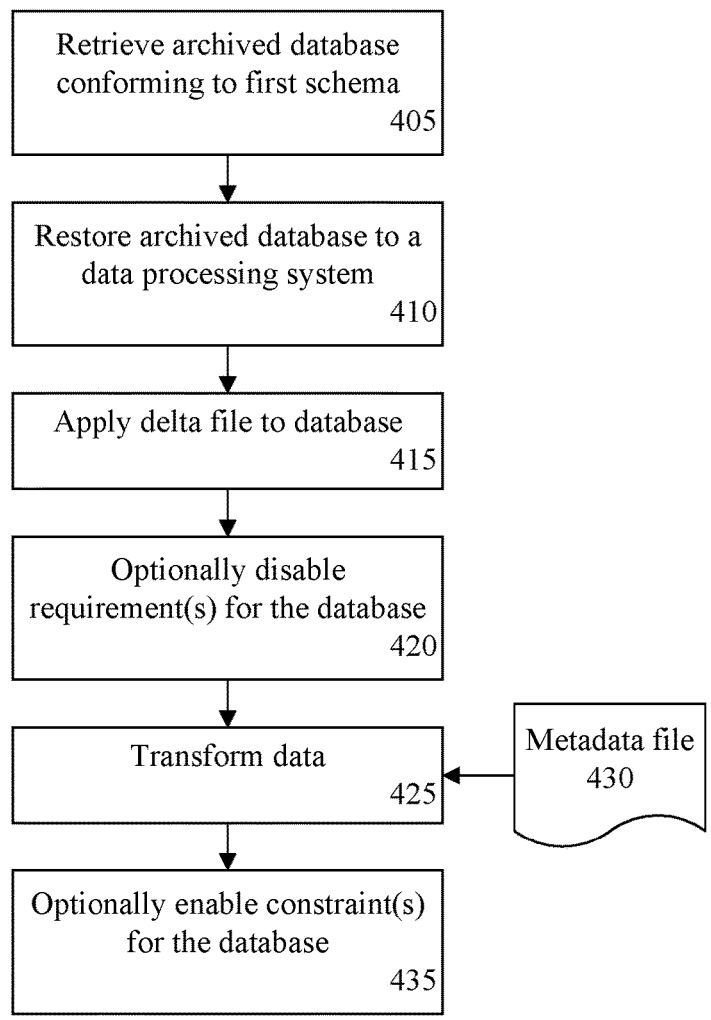
FIG. 3
FIG. 4

MANAGING TEST DATA IN LARGE SCALE PERFORMANCE ENVIRONMENT

BACKGROUND

One or more embodiments disclosed within this specification relate to processing a database.

Large-scale performance systems typically utilize a database that stores the data used or referenced by the system. In order to test such a system, a large amount of test data must be generated and populated within a test database that can be used by the system. A test database that includes approximately one million or more records is not uncommon. Generating the test database that includes the records and all associated metadata can take hours to complete. In some cases, generation of the complete test database can take more than approximately 24 hours.

When attempting to correct a defect or when updating the system, the modification that is implemented can require a change to the schema of the database. Testing the modified system necessitates the generation of a new test database that conforms to the new schema. This process, like generating the original test database, can take a significant amount of time to complete, thereby delaying testing of the modified system and release of the correction or update to the system.

BRIEF SUMMARY

One or more embodiments disclosed within this specification relate to processing a database.

An embodiment can include a method of processing a database. The method can include generating a delta file from a first schema and a second and different schema, applying the delta file, using a processor, to the database, wherein the database conforms to the first schema, and translating data of the database in accordance with a metadata file.

Another embodiment can include a method of processing a database. The method can include comparing, using a processor, a delta file with a risk assessment criterion, wherein the delta file is generated from a first schema and a second and different schema, and assigning a risk level to a change specified within the delta file according to the comparing.

Another embodiment can include a system for processing a database. The system can include a processor. The processor can be configured to initiate executable operations and/or functions as described within this specification.

Another embodiment can include a computer program product for processing a database. The computer program product can include a computer readable storage medium having stored thereon program code that, when executed, configures a processor to perform the various functions and/or operations described within this specification.

BRIEF DESCRIPTION OF THE SEVERAL VIEWS OF THE DRAWINGS

FIG. 3 is a flow chart illustrating a method of processing a database in accordance with another embodiment disclosed within this specification.

FIG. 4 is a flow chart illustrating a method of processing a database in accordance with another embodiment disclosed within this specification.

DETAILED DESCRIPTION

Figure 1:
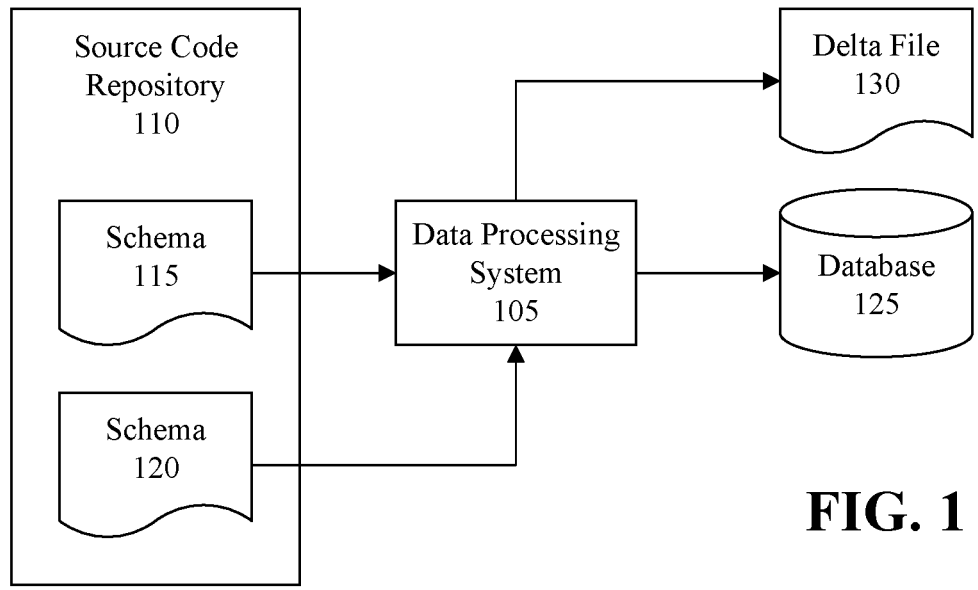
FIG. 1 is a block diagram illustrating an example of a data processing system configured for database processing in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to processing a database and, more particularly, to managing test data across multiple builds of a system. In accordance with the inventive arrangements disclosed within this specification, a database that has been generated for use with a first version (e.g., build) of a system can be updated, or transformed, for use with a second and different version of the system. The processing can include, for example, transitioning the database from conforming to a first schema utilized by the first version of the system to conforming to a second schema that is different from the first schema. The second schema can be one that is utilized by the second and different version of the system. The data within the database also can be translated, when applicable, using one or more user directives. The data, for example, can be translated from a first data format used by the first version of the system to a second data format that is different from the first data format and which is used by the second version of the system.

In a further aspect, the various changes required to transition the database from conformance with the first schema to conformance with the second schema can be evaluated for risk. For example, a level of risk can be determined and assigned to each change needed to transition the database to conform to the second schema. The risk of introducing errors or otherwise corrupting the database with each change that is required can be determined. Changes can be automatically applied, applied selectively, or not at all based upon the determined risk of each respective change. Further aspects of the embodiments will be described in greater detail within this specification.

FIG. 1 is a block diagram illustrating an example of a data processing system 105 configured for database processing in accordance with an embodiment disclosed within this specification. As shown, data processing system 105 can be communicatively linked with a source code repository (repository) 110, e.g., another data processing system or data storage system. Repository 110 can store a plurality of different versions (builds) of a system that is under development or under test. The system versions stored within repository 110, for example, can be versions of a software-based system that utilize or execute in conjunction with a database. The system versions stored within repository 110, for example, can be a large scale, performance-based system that executes in conjunction, or cooperation, with a database. Repository 110 can store the source code for each of a plurality of different versions of the system. For purposes of reference and illustration, the system versions stored in repository 110 can be referred to as system version "N," where N can be a numeric value specifying a version number of the system. From time to time, systems stored within repository 110 also can be referred to as the "system under test" or a "test system." The version number may or may not be used when referring to a system under test or a test system.

For purposes of illustration, a first version of the test system (test system 1) utilizes a database defined by schema 115. A second and different version of the test system (test system 2) utilizes a different version of the database defined by schema 120. Schema 120 is different from schema 115. Each schema generally specifies the structure, e.g., the hierarchy, of the database utilized by each respective test system. A schema, for example, can specify the various objects of the database, e.g., tables, columns, rows, properties or requirements for fields in terms of data formatting and/or allowable data types, etc. Test system 2 can incorporate a fix for a particular defect found in test system 1. The resulting modification to test system 1 results in test system 2 and introduces a change into schema 115 resulting in schema 120.

FIG. 1 further illustrates that a database 125 has been created. Database 125 has a structure that conforms to schema 115 and can be used by test system 1. Further, the data stored in database 125 conforms to a first data format that is usable by test system 1. In one example, database 125 can be a test database that is created for purposes of testing test system 1. Because test system 2 utilizes a database that conforms to schema 120 (and likely has a different data format, e.g., a second data format), database 125 is unusable with test system 2, whether for actual use, testing, or the like.

For example, testing, often referred to as a "test cycle," can include component verification testing (CVT), system verification testing (SVT), and regression testing. Testing further can include tests for stress, reliability, scalability, security breaches, and performance. During the performance phase of SVT, the test environment can be loaded with as many objects as are supported by the test system and then run under stress conditions to induce problems that would only manifest during long run testing. After the test environment is loaded with objects for performance testing, a backup of the test environment can be created so that if or when a defect is found and fixes are placed in the test system, the test environment can be restored quickly and efficiently so the fixes to the test system can be verified.

Consider the case in which database 125 is a test database (e.g., a test environment) that is generated to include a million or more unique keys and accompanying metadata. Generating such a test database can take a significant amount of time. Further, consider the case in which a defect in test system 1 is discovered through testing conducted using database 125. Test system 2 is created as a consequence of modifying test system 1 to correct the defect. In accordance with the embodiments disclosed within this specification, database 125 can be transformed for use with test system 2. For example, database 125 can be transitioned to conform to schema 120 for use in testing test system 2 as opposed to generating an entirely new test database that is compliant with schema 120. Further, data that is formatted in the first format corresponding to test system 1 can be translated into a second and different format that is utilized by test system 2. Transforming database 125, as opposed to generating an entirely new test database which can require time periods of approximately 24 hours or more in some cases, can significantly reduce the time required for testing test system 2.

Accordingly, in one aspect, data processing system 105 can be configured to obtain schema 115 and schema 120 from repository 110. Data processing system 105 can compare schema 115 with schema 120 and generate a delta file 130. Delta file 130 can specify each of the differences, e.g., each of the changes, determined between schema 115 and schema 120 during the comparison. For example, schema 115 and schema 120 can be specified in any of a variety of different formats including, but not limited to, a markup language file (eXtensible Markup Language), data description language, or the like. Similarly, delta file 130 can be implemented or specified using the same or similar conventions. In general, delta file 130 can specify structural changes to be applied to database 125. For instance, delta file 130 can specify new objects to be created, e.g., new tables, changes to existing objects, e.g., new columns, or the like.

Figure 2:
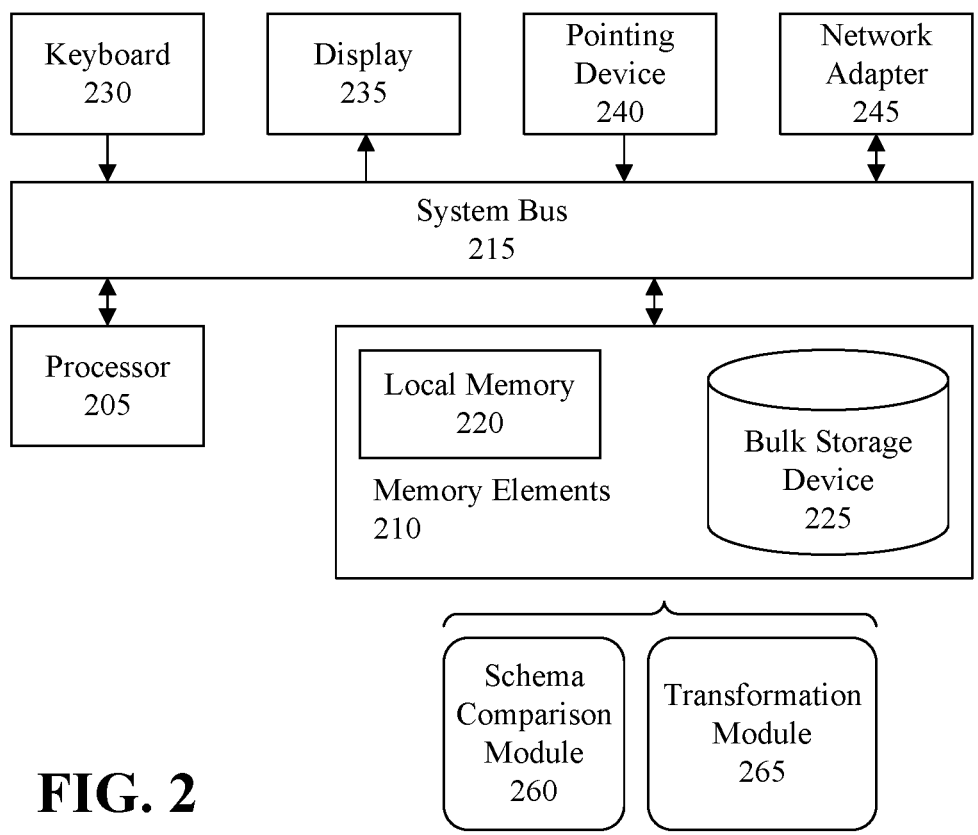
FIG. 2 is a block diagram illustrating a data processing system configured for database processing in accordance with another embodiment disclosed within this specification.

FIG. 2 is a block diagram illustrating a data processing system configured for database processing in accordance with another embodiment disclosed within this specification. FIG. 2 illustrates an example of data processing system 105 as described with reference to FIG. 1. Like numbers will be used to refer to the same items throughout this specification.

Data processing system 105 can include at least one processor 205 coupled to memory elements 210 through a system bus 215 or other suitable circuitry. As such, data processing system 105 can store program code within memory elements 210. Processor 205 can execute the program code accessed from memory elements 210 via system bus 215. In one aspect, for example, data processing system 105 can be implemented as a computer that is suitable for storing and/or executing program code. It should be appreciated, however, that data processing system 105 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard drive or other persistent data storage device. System 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to data processing system 105. The I/O devices can be coupled to system 105 either directly or through intervening I/O controllers. One or more network adapters 245 also can be coupled to data processing system 105 to enable data processing system 105 to become coupled to other systems, computer systems, remote printers, and/or remote storage devices through intervening private or public networks. Modems, cable modems, and Ethernet cards are examples of different types of network adapters 245 that can be used with data processing system 105.

As pictured in FIG. 1, memory elements 210 can store a schema comparison module 260 and a transformation module 265. Schema comparison module 260 can be configured to compare a first schema with a second schema, determine or otherwise identify the differences between the two schemas and, thus, the changes to be applied to a first version of a database conforming to the first schema to generate a different version of the database conforming to the second schema.

Transformation module 265 can be configured to implement the database processing that transitions a database from conforming to a first schema (e.g., schema 115) to one that conforms to a second and different schema (e.g., schema 120) based, at least in part, upon the delta file generated by schema comparison module 260. In one aspect, transformation module 265 can transition, e.g., modify, the database in place to conform to the second schema as opposed to creating a copy that is updated. Transformation module 265 further can perform any data translations that may be required.

It should be appreciated that while schema comparison module 260 and transformation module 265 are illustrated as being co-located within data processing system 105, this need not be the case. For example, in another aspect, a second and/or different data processing system can be used to generate a delta file from a comparison of the first schema and the second schema. In that case, transformation module 265 can reside within data processing system 105 without schema comparison module 260. Accordingly, data processing system 105 still can transform a database as described within this specification.

FIG. 3 is a flow chart illustrating a method 300 of processing a database in accordance with another embodiment disclosed within this specification. Method 300 can be performed by a data processing system such as data processing system 105 of FIGS. 1 and 2.

In step 305, the data processing system can retrieve a first schema, for example, from a repository. The first schema can define the database for test system 1. In step 310, the data processing system can retrieve a second schema from the repository. The second schema can define the database for test system 2. In step 315, the data processing system can compare the first schema with the second schema. In comparing the two schemas, the system can determine each difference, e.g., each delta, between the two schemas.

In step 320, the data processing system can generate a delta file. The delta file can specify each change, or delta, that, if applied to a database that conforms to the first schema, results in the database conforming to the second schema. The differences determined in step 315, for example, can be specified within the delta file as one or more changes that specify the particular actions to be taken to modify the database to conform to the second schema.

FIG. 4 is a flow chart illustrating a method 400 of processing a database in accordance with another embodiment disclosed within this specification. Method 400 can be performed by a data processing system such as data processing system 105 of FIGS. 1 and/or 2. Method 400 can begin in a state in which a database that conforms to the first schema has been generated. For example, the database can be a test database generated for testing test system 1. The database can be archived or otherwise stored for subsequent use.

In step 405, the data processing system can retrieve the archived (or stored) database that conforms to the first schema. For example, the database can be archived in a compressed format that retains the structure of the database, e.g., the directory tree of the database and/or file structure. While a database can be archived using the JAR file format, the embodiments disclosed within this specification are not intended to be limited to any particular technique for archiving or storing a database. For example, any of a variety of different technological solutions are available for archiving or backing up test environments and can be used with the embodiments disclosed within this specification.

In step 410, the data processing system can restore the archived database to a target data processing system (e.g., within the data processing system that is performing method 400 or to another data processing system communicatively linked to the data processing system implementing method 400). For instance, the archived database can be decompressed and stored on the target data processing system.

In step 415, the data processing system can apply the delta file to the database. The data processing system can apply one or more changes, or each change, specified by the delta file to the database. Examples of changes to the database that can be implemented can include, but are not limited to, the addition of a column to a table, the addition of a new table to the database, etc. After application of the delta file to the database, the database conforms to the second schema, at least in terms of object structure and/or hierarchy. The data contained within the database, however, is unchanged. The data within the database still adheres to the first data format utilized by test system 1.

In step 420, the data processing system optionally can disable one or more requirements for the database. The data processing system can, when required, relax, e.g., disable, one or more requirements specified by the first schema. For example, the database can include a column of account numbers. One of the modifications to test system 1 can be a migration from the use of 12 digit account numbers to 15 digit account numbers. The first schema, therefore, specifies a requirement that each entry in the account number column is to have 12 digits. The second schema, however, can specify a requirement that each entry in the account number column is to have 15 digits.

To transform the database to specify 15 digit account numbers instead of 12 digit account numbers, the data in the account number column must be translated from 12 digit account numbers to 15 digit account numbers. Simply translating the data to 15 digit account numbers, however, will induce an error since the resulting data in the account number column violates the requirement specified by the first schema. Thus, the requirement must be disabled.

Accordingly, in step 425, the data processing system can transform the data within the database as may be required. In one aspect, a metadata file 430 can be utilized to specify the particular transformations that are to be applied to the data in the database. Continuing with the account number example, metadata file 430 can specify the manner in which the account numbers are to be transformed from 12 digit account numbers to 15 digit account numbers. Metadata file 430 can specify an algorithm to be used to update the account numbers to 15 digits. In other example, e.g., where a new column and/or table is added, the metadata file can specify an algorithm indicating how to generate the data that is used to populate the new column and/or table. For example, metadata file 430 can specify whether the data is to be randomly generated, is generated as a function of other data in the database, etc.

In step 435, the data processing system optionally can enable one or more requirements for the database. In one aspect, requirements that were disabled can be enabled. In another aspect, requirements specified by the first schema that were disabled can remain disabled while one or more other requirements specified by the second schema can be enabled, e.g., in lieu of enabling the requirements of the first schema previously disabled. Still, a combination of requirements for the first schema and the second schema can be enabled. The example utilizing account numbers is one in which a requirement of the first schema (account numbers must have 12 digits) remains disabled while a new requirement from the second schema (account numbers must have 15 digits) is enabled. In cases such as the aforementioned example, the newly enabled or applied requirement can pertain to the same data that was transformed and to which the relaxed requirement pertained. In another example, however, both schemas can require that the account number be unique. Accordingly, this requirement is common to both the first schema and the second schema. As such, when the requirement for unique account numbers is enabled, the data processing system is enabling a requirement of both the first schema and the second schema.

Method 400 illustrates a technique that can be used to transform a database to conform to a different schema. The transformation involves transitioning the database from the first schema to the second schema. The transformation further involves translating data from a first data format corresponding to the first schema to a second and different data format corresponding to the second schema. Thus, rather than generating a new database, e.g., from scratch, or copying the prior database and updating the copy, the existing database can be updated or transformed in place.

Figure 5A:
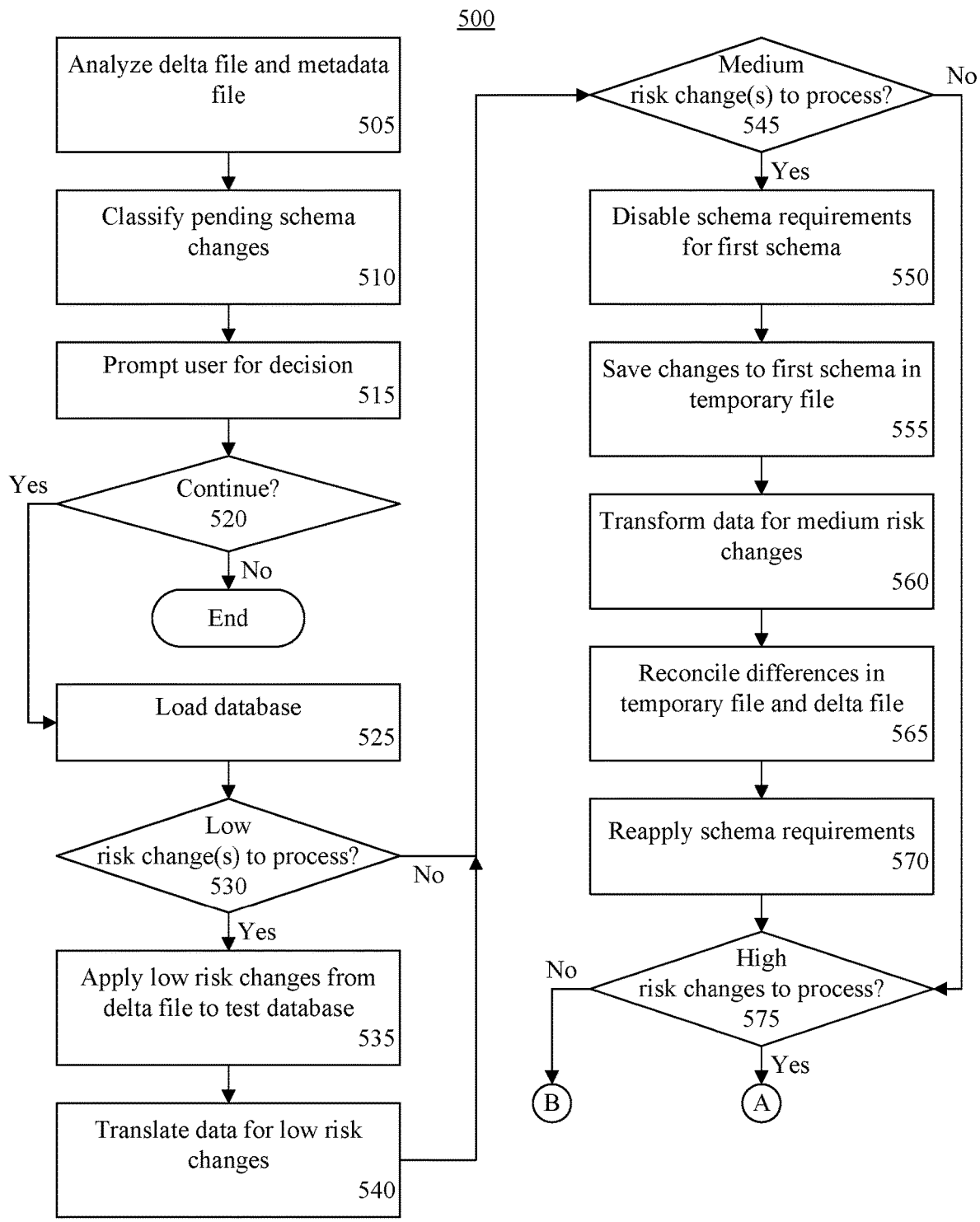
FIGS. 5A and 5B, taken collectively, form a flow chart illustrating a method of processing a database in accordance with another embodiment disclosed within this specification.
Figure 5B:
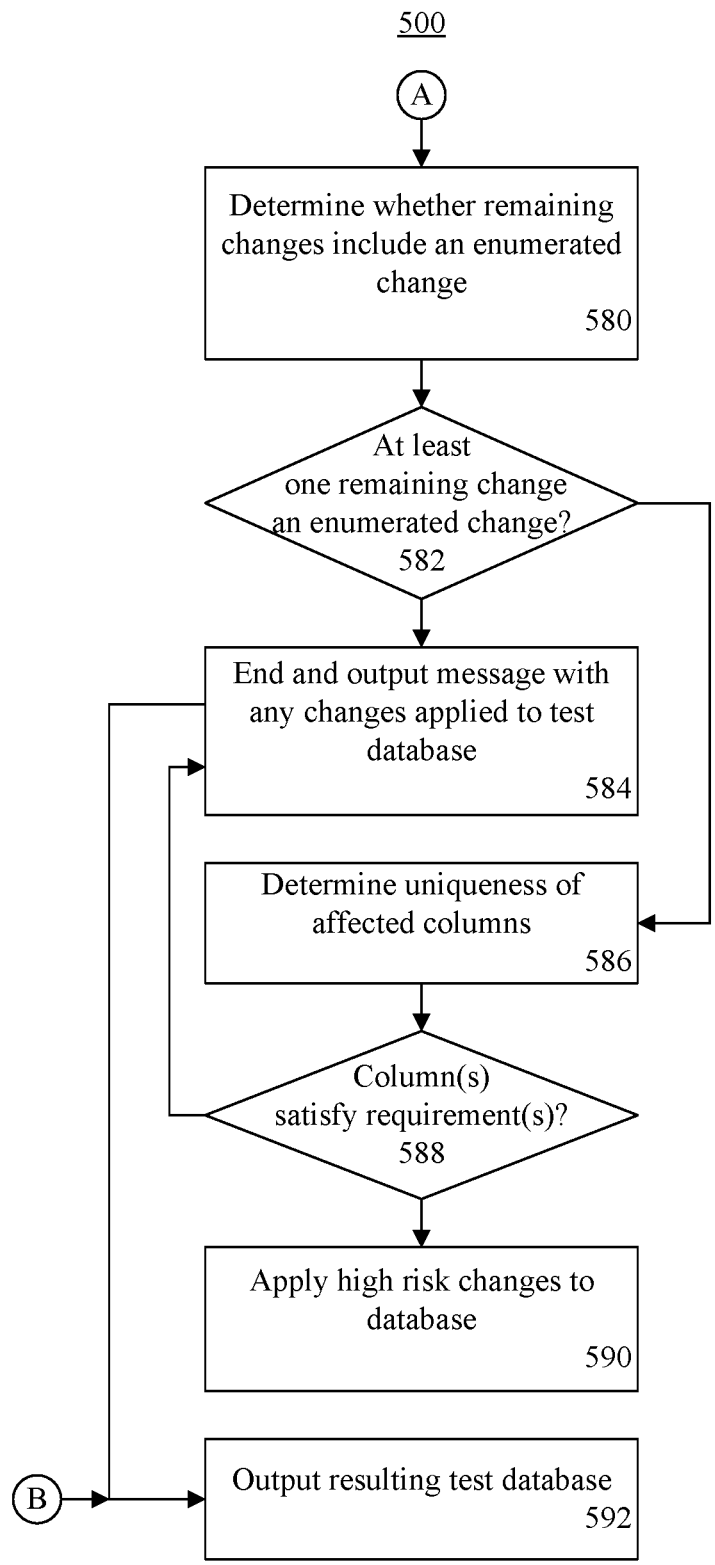

FIGS. 5A and 5B, taken collectively, form a flow chart illustrating a method 500 of processing a database in accordance with another embodiment disclosed within this specification. Method 500 illustrates an exemplary method of transforming a database in terms of both schema and data formatting. Method 500 can be performed by a data processing system as described with reference to FIGS. 1-4 of this specification. Method 500 can begin in a state where a database to be transformed has been created and restored, a delta file has been generated, and a metadata file specifying data format changes has been generated.

Method 500 illustrates an exemplary embodiment in which each of a plurality of changes specified in the delta file are assigned to one of a plurality of risk levels according to a comparison of the change with risk assessment criteria. Each of the changes can be implemented according to one of a plurality of different implementation procedures correlated with the risk level of the change as described in further detail below. Further, users can be queried as to whether to perform operations when the operation exceeds a threshold, e.g., is assigned a risk level of medium or high. For example, responsive to determining that the risk level of the change is above a threshold risk level, the data processing system can generate a prompt inquiring whether to apply the change.

Accordingly, method 500 can begin in step 505 where the data processing system can analyze the delta file and the metadata file. In one aspect, for example, the data processing system can search for instances of keywords within the delta file and/or the metadata file that indicate particular actions such as addition of a table, addition of a column, deletion of a table, deletion of a column, the rendering of particular data (e.g., a column) as obsolete, or the like.

In step 510, the data processing system can classify the pending schema changes according to risk. For example, each of the changes specified by the delta file can be assigned a particular risk level such as low, medium, or high. In illustration, risk assessment criteria can be specified in which particular database operations can be correlated with keywords that, when found within the delta file and/or the metadata file, indicate that the correlated database operation must be performed. The database operation that are detectable and correlated with keywords each can be enumerated and assigned to a particular risk level.

In classifying the changes needed to transform the database, the data processing system can compare keywords located in the delta file and/or metadata file with the risk assessment criteria. More particularly, keywords located in the delta file and/or the metadata file can be matched with keywords in the risk assessment criteria. The risk level that is associated with the matched keyword in the risk assessment criteria can be assigned to the change in the delta file and/or the metadata file. In one example, the risk levels can be defined as low, medium, or high. Low risk operations can include operations considered unlikely to cause any corruption of the database. Medium risk operations can include operations with an elevated risk of causing corruption of the database. High risk operations can include any operation for which explicit user approval is required for performing the operation. Further risk level assessment criteria and examples will be described within this specification.

An example of a delta file is illustrated below after the deltas noted therein have been classified in terms of risk. As such, the delta file illustrates various operations. Within the example, the deltas are arranged according to risk level as determined by the data processing system and described within this specification. Further, within the example, explanatory annotations of the operation to be performed are included in brackets [] in some cases. Risk level headings are also placed in brackets. The portion in brackets is not part of the delta file, but rather included for purposes of illustration.

In step 515, the data processing system optionally can prompt the user for a decision. For example, the data processing system can present the pending changes that are to be applied to the database in conjunction with the assigned risk level of each respective change. In another example, the data processing system can prompt the user whether to implement a given change or continue to the next change prior to implementing each change or prior to implementing each change of a particular risk level. In still another example, the data processing system can prompt the user whether to implement changes of a particular risk level or continue to changes of another risk level. For example, the data processing system can query the user prior to implementing low risk changes, prior to implementing medium risk changes, and again prior to implementing high risk changes. The embodiments disclosed within this specification, however, are not intended to be limited to the examples presented.

In step 520, the data processing system can determine whether to proceed with the database transformation based upon the response received from the user. Responsive to a user input indicating that the user wishes to terminate the database transformation, method 500 can end. Responsive to a user input indicating that the user wishes to continue with the database transformation, method 500 can proceed to step 525.

In another aspect, the user can select only those deltas (and corresponding operations) that are desired from a plurality of listed deltas necessary to transform the database. When no operations are selected, method 500 can end. When one or more of the operations are selected, where each operation is associated with a risk level, method 500 can continue processing only the selected operations (e.g., the selected deltas).

In step 525, the data processing system can load the database (e.g., the test database). In step 530, the data processing system can determine whether there are any low risk changes to be processed or applied to the database. Responsive to determining that one or more low risk changes are to be applied to the database, method 500 can proceed to step 535. Responsive to determining that no further low risk changes remain to be applied to the database, method 500 can proceed to step 545.

In step 535, the data processing system can apply the low risk change(s) from the delta file to the database. In one aspect, a low risk change can be one that does not require

```
[Low Risk Changes]
DROP TABLE KMT_OBSOLETE_TABLE
DROP INDEX IDX_CERT_AUTOSTATE_CHANGE [Obsolete index]
CREATE INDEX IDX_CERT_EXPIRTION_DATE ON KMT_CERT
   (EXPIRATIONDATE)
MINPCTUSED 20; [New Index]
ALTER TABLE KMT_CERT ADD COLUMN ALIAS VARCHAR(100) NOT
   NULL;
ALTER TABLE KMT_CERT ADD COLUMN KEYSTORE VARCHAR(100)
   NOT NULL;
ALTER TABLE KMT_CERT DROP CONSTRAINT PK_CERT;
[Medium Risk Changes]
UPDATE KMT__CERT SET STATE = STATE * 10 [Apply a function to an
   existing column]
[High Risk Changes]
ALTER TABLE KMT__CERT ADD CONSTRAINT PK_CERT PRIMARY KEY
   (UUID, ALIAS, KEYSTORE); [Converting a single column primary key to
   multi column primary key]
DROP INDEX IDX_CERT_HASHVALUE; [Dropping an existing index]
CREATE UNIQUE INDEX IDX_CERT_HASHVALUE ON KMT_CERT
   (HASHVALUE) MINPCTUSED 20; [Converting an index to unique index]
``` any relaxation of a requirement in order to apply the change and subsequently transform the data, if necessary. For example, the creation of a new table, the addition of a new column to a table, etc., can be considered low risk. After step 535, the database, at least with respect to the low risk change that was applied, conforms to the second schema. The data affected by the low risk change, however, still conforms to the first data format.

In step 540, the data processing system can translate the data for the low risk change(s) applied in step 535. Transforming the data can include operations such applying an algorithm to existing data to derive new data, generating new data from existing data in the database to populate a column, table, or the like, and generating random data. Accordingly, data for any objects of the database that were modified in step 535 can be translated. After performance of step 540, the data that is affected by the low risk change applied in step 535 is formatted in accordance with the second data format used with the second schema. After step 540, method 500 can continue to step 545.

In step 545, the data processing system can determine whether there are any medium risk changes to be processed or applied to the database. Responsive to determining that one or more medium risk changes are to be applied to the database, method 500 can proceed to step 550. Responsive to determining that no medium risk changes remain to be applied to the database, method 500 can proceed to step 575.

In step 550, the data processing system can disable schema requirements for the first schema. In one aspect, the data processing system can disable any schema requirements that relate to a particular medium risk delta that is selected for processing and application to the database. In another aspect, any schema requirements for the first schema relating to a medium risk change (e.g., all schema requirements relating to a medium risk change), or all changes regardless of risk level, can be disabled. In still another aspect, the data processing system can perform an analysis to determine the particular requirements that must be disabled. For example, the data processing system can determine which requirements of the first schema will be violated by the translation of data to be performed for any medium risk changes to be applied as determined from the metadata file and the delta file. In that case, the data processing system can disable only those requirements that need to be disabled to avoid an illegal condition in which the translated data does not conform to the requirement of the first schema.

In step 555, the data processing system can save any changes to the first schema implemented within step 550 to a temporary file. For example, consider the case in which an account number column is 12 digits in the first schema and is to be 15 digits in the second schema. Both schema require a unique account number. The requirement of the first schema, e.g., 12 digits and being unique, can be stored in the temporary file. In step 560, the data processing system can translate the data affected by the medium risk change being applied to the database. For example, the 12 digit account numbers can be translated into 15 digit account numbers using the specified metadata.

In step 565, the data processing system can reconcile the differences in the temporary file with the changes in the delta file. For example, the data processing system can determine whether the old requirements conflict with the new requirements. In this example, the 12 digit requirement conflicts with the 15 digit requirement. The uniqueness required of both schemas does not conflict. In step 570, the data processing system can enable the schema requirements, e.g., the rules and constraints, based upon the reconciliation. Requirements that do not conflict (e.g., uniqueness of account numbers) can be enabled regardless of the schema with which the requirement is associated. In the case of a conflicting requirement, only the requirement of the new, e.g., second, schema is enabled. Thus, referring to the prior example, the 15 digit requirement is enabled whereas the 12 digit requirement conflicts, is determined to be obsolete due to the conflict with the requirement of the second schema, and is not enabled. Those requirements determined to be obsolete can be discarded. Accordingly, the resulting requirements that are enabled can be a mixture of requirements from the first and the second schemas.

In step 575, the data processing system can determine whether there are any high risk changes to be processed or applied to the database. Responsive to determining that one or more high risk changes are to be applied to the database, method 500 can proceed to step 580 in FIG. 5B. Responsive to determining that no high risk changes are to be applied to the database, method 500 can proceed to step 592 in FIG. 5B.

In step 580, the data processing system can determine whether any of the remaining changes to be implemented include an enumerated type of change. Examples of enumerated types of changes can include, but are not limited to, converting a non-unique index to a unique index in a table, adding multiple columns to the primary key, or the like. The enumerated types of changes represent supported high risk operations that can be performed in some situations. For example, the enumerated types of high risk operations can be performed responsive to an affirmative determination in step 588.

In step 582, the data processing system can determine whether at least one of the remaining changes, e.g., the high risk changes, include one of the enumerated changes. Responsive to determining that one or more of the remaining changes do not include an enumerated change, method 500 can proceed to step 584. Responsive to determining that one or more of the remaining changes do include an enumerated change, method 500 can proceed to step 586.

Examples of changes that are not supported and, as such, are not enumerated, can include dropping or removing a column or adding a column that cannot be computed from existing data and cannot be randomly generated, but still must conform to multilevel database constraints. For example, adding a new table with new primary and foreign keys is not supported. Further examples of unsupported high risk operations can include moving a table from one tablespace to a larger tablespace.

In step 584, the data processing system can discontinue processing and output a message indicating why processing has terminated. For example, the message can indicate the type of changes that are left to be processed with the risk level associated with each respective change. The message can indicate that the type of high risk change is not supported or considered too likely to result in corruption of the database to be performed. The message also can indicate which changes have been applied. After step 584, method 500 can continue to step 592, where the resulting database can be output. The resulting database includes any low and medium risk changes that have been applied.

Continuing with step 586, the data processing system can determine the uniqueness of the columns of the database affected by the high risk change to be implemented. The columns to be processed, for example, can be scanned to ensure that the column(s) does not duplicate values. In step 588, the data processing system can determine whether the column(s) satisfies the requirements in terms of uniqueness (e.g., does not duplicate values). Responsive to determining that the columns will not satisfy the requirements, method 500 can proceed to step 584 and continue as described. In this case, however, the changes to the database can include one or more high risk changes depending upon the determination in step 586. Responsive to determining that the columns do satisfy the requirements, method 500 can proceed to step 590 where the high risk changes are applied to the database. It should be appreciated that numerous columns can be evaluated and that each column can be evaluated independently resulting in one or more high risk changes being potentially applied while one or more other high risk changes are not.

After step 590, method 500 can proceed to step 592, where the resulting database is output. The resulting database, when proceeding to step 592 from step 590 or step 575, will be a database that conforms to the second schema and that includes data formatted according to the second data format.

Method 500 is provided as an example of a database processing technique. In one or more other embodiments, various steps can be ordered differently. For example, in another aspect, high risk and/or medium risk changes can be evaluated prior to applying any change regardless of risk level to the database to ensure that the process can be complete before making any changes. For example, steps 580-588 can be performed prior to other steps. Only responsive to determining that the high risk changes can be applied will the data processing system first apply low risk changes, then medium risk changes, and then proceed with the high risk changes.

In instances in which either the transition from a first schema to the second schema (application of a change) or a data translation fails, the details as to the changes that are being implemented can be saved and used to further enhance the decision making process in terms of what is considered low, medium, or high risk and whether the process should continue in view of any prior failures. For example, the data processing system can escalate the level of risk of a particular operation responsive to that operation failing a designated number of times.

In another embodiment, a delta file can be evaluated for risk without continuing to implement the various deltas noted therein. For example, the delta generation functions can be executed in combination with operations assigning risk to each of the deltas within the delta file. That information, e.g., the risk level of deltas, can be utilized by developers to determine how a change to a schema will affect a larger system under test and test data that has been generated for the system under test. Using such a tool, developers can determine whether to implement a given change or defer the change to a later time.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

The invention claimed is:

1. A computer-implemented method of processing a database conforming to a first schema, comprising:
   generating, using a hardware processor, a delta file based upon a comparison between the first schema and a second schema different than the first schema;
   updating, using the delta file, the database to conform to the second schema; and
   translating data of the database in accordance with a metadata file, wherein
   the updating the database does not change the data in the database.

2. The method of claim 1, further comprising
   assigning a change specified in the delta file to one of a plurality of risk levels according to a comparison of the change with a risk assessment criterion.

3. The method of claim 2, wherein
   upon the change being assigned a risk level below a threshold risk level, the updating and the translating are performed without user intervention.

4. The method of claim 2, further comprising
   generating, upon the change being assigned a risk level above a threshold risk level, a prompt.

5. The method of claim 1, wherein
   each of a plurality of changes specified in the delta file are assigned to one of a plurality of risk levels according to a comparison of each change with risk assessment criteria; and
   each change within the delta file is implemented according to one of a plurality of different implementation procedures correlated with the risk level of the change.

6. The method of claim 1, wherein
   the metadata file specifies at least one transformation for the data, during the translating, to conform the data with the second schema.

7. A computer hardware system configured to process a database conforming to a first schema, comprising:
   at least one hardware processor configured to initiate the following executable operations:
      generating a delta file based upon a comparison between the first schema and a second schema different than the first schema;
      updating, using the delta file, the database to conform to the second schema; and
      translating data of the database in accordance with a metadata file, wherein
      the updating the database does not change the data in the database.

8. The system of claim 7, wherein the at least one hardware processor is further configured to initiate
   assigning a change specified in the delta file to one of a plurality of risk levels according to a comparison of the change with a risk assessment criterion.

9. The system of claim 8, wherein
   upon the change being assigned a risk level below a threshold risk level, the updating and the translating are performed without user intervention.

10. The system of claim 8, wherein the at least one hardware processor is further configured to initiate
    generating, upon the change being assigned a risk level above a threshold risk level, a prompt.

11. The system of claim 7, wherein
    each of a plurality of changes specified in the delta file are assigned to one of a plurality of risk levels according to a comparison of each change with risk assessment criteria; and
    each change within the delta file is implemented according to one of a plurality of different implementation procedures correlated with the risk level of the change.

12. The system of claim 7, wherein
    the metadata file specifies at least one transformation for the data, during the translating, to conform the data with the second schema.

13. A computer program product for processing a database conforming to a first schema, comprising:
    a hardware storage device having stored thereon program code that, when executed, configures a hardware processor to perform:
       generating a delta file based upon a comparison between the first schema and a second schema different than the first schema;
       updating, using the delta file, the database to conform to the second schema; and
       translating data of the database in accordance with a metadata file, wherein
    the updating the database does not change the data in the database, and
    the computer readable storage device does not consist of a transitory, propagating signal.

14. The computer program product of claim 13, wherein the at least one hardware processor is further configured to perform
    assigning a change specified in the delta file to one of a plurality of risk levels according to a comparison of the change with a risk assessment criterion.

15. The computer program product of claim 14, wherein
    upon the change being assigned a risk level below a threshold risk level, the updating and the translating are performed without user intervention.

16. The computer program product of claim 14, wherein the at least one hardware processor is further configured to perform
    generating, upon the change being assigned a risk level above a threshold risk level, a prompt.

17. The computer program product of claim 13, wherein
    each of a plurality of changes specified in the delta file are assigned to one of a plurality of risk levels according to a comparison of each change with risk assessment criteria; and
    each change within the delta file is implemented according to one of a plurality of different implementation procedures correlated with the risk level of the change.

18. The computer program product of claim 13, wherein
    the metadata file specifies at least one transformation for the data, during the translating, to conform the data with the second schema.

* * * * *